United States Patent
Rofougaran (10) Patent No.: US 7,881,753 B2
(45) Date of Patent: *Feb. 1, 2011

(54) METHOD AND SYSTEM FOR SHARING MULTIPLE ANTENNAS BETWEEN TX AND RX IN A REPEAT FIELD OF POLARIZATION ISOLATION

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 11/863,898

(22) Filed: Sep. 28, 2007

(65) Prior Publication Data

US 2009/0088213 A1  Apr. 2, 2009

(51) Int. Cl.
*H04M 1/00* (2006.01)
(52) U.S. Cl. ............... 455/562.1; 455/11.1; 455/7; 455/13.1; 455/13.3
(58) Field of Classification Search ............ 455/7, 455/11.1, 12.1, 13.1, 13.3, 33.4, 135, 226.4, 455/423, 428, 575.5, 513, 562.1, 561
See application file for complete search history.

(56) References Cited

U.S. PATENT DOCUMENTS

| | | | |
|---|---|---|---|
| 4,979,170 A * | 12/1990 | Gilhousen et al. | 370/321 |
| 6,201,801 B1 * | 3/2001 | Dent | 370/342 |
| 6,339,611 B1 * | 1/2002 | Antonio et al. | 375/130 |
| 2004/0166802 A1 * | 8/2004 | McKay et al. | 455/15 |
| 2006/0063484 A1 * | 3/2006 | Proctor et al. | 455/7 |
| 2007/0066220 A1 * | 3/2007 | Proctor et al. | 455/11.1 |
| 2007/0072603 A1 * | 3/2007 | Wang | 455/427 |
| 2007/0232228 A1 * | 10/2007 | McKay et al. | 455/11.1 |
| 2007/0268846 A1 * | 11/2007 | Proctor et al. | 370/279 |
| 2008/0002652 A1 * | 1/2008 | Gupta et al. | 370/338 |
| 2008/0136736 A1 * | 6/2008 | Proctor et al. | 343/893 |
| 2009/0088069 A1 * | 4/2009 | Rofougaran | 455/7 |
| 2009/0088071 A1 * | 4/2009 | Rofougaran | 455/13.1 |

* cited by examiner

*Primary Examiner*—Tan Trinh
(74) *Attorney, Agent, or Firm*—McAndrews, Held & Malloy, Ltd.

(57) ABSTRACT

A repeater device may be utilized to enable forwarding extreme high frequency (EHF) communication between EHF-enabled wireless devices. The repeater device may utilize polarization isolation to prevent and/or reduce interference between received and transmitted EHF RF signals in the repeater device. The repeater device may utilize plurality of polarization antenna arrays for reception and transmission of EHF RF signals to facilitate polarization isolation between received and transmitted EHF RF signals. Alternatively, the repeater device may utilize a single polarization antenna array, with switching elements, to facilitate polarization isolation between received and transmitted EHF RF signals. The repeater device may utilize control connections to enable communicating with the EHF-enabled wireless devices to facilitate performing polarization isolation at the repeater device. Non-EHF interfaces, for example Bluetooth, may be utilized to establish the control connections.

25 Claims, 5 Drawing Sheets

METHOD AND SYSTEM FOR SHARING MULTIPLE ANTENNAS BETWEEN TX AND RX IN A REPEAT FIELD OF POLARIZATION ISOLATION

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for sharing multiple antennas between a transmitter and receiver in a repeat field of polarization isolation.

BACKGROUND OF THE INVENTION

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications.' With respect to accessibility of this designated portion of the spectrum, 60 GHz communications is similar to other forms of unlicensed spectrum use, for example Wireless LANs (WLAN) or Bluetooth in the 2.4 GHz ISM bands. However, communications at 60 GHz may be significantly different in aspects other than accessibility. For example, 60 GHz signals may provide markedly different communications channel and propagation characteristics, at least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharing multiple antennas between a transmitter and receiver in a repeat field of polarization isolation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing multiple antennas between a transmitter and receiver in a repeat field of polarization isolation. A repeater device may be utilized to enable forwarding extreme high frequency (EHF) communication between EHF-enabled wireless devices. The repeater device may utilize polarization isolation to prevent and/or reduce interference between received and transmitted EHF RF signals in the repeater device. The repeater device may utilize plurality of polarization antenna arrays for reception and transmission of EHF RF signals to facilitate polarization isolation between received and transmitted EHF RF signals. Alternatively, the repeater device may utilize a single polarization antenna array, with switching elements, to facilitate polarization isolation between received and transmitted EHF RF signals. The repeater device may utilize control connections to enable communicating with the EHF-enabled wireless devices to facilitate performing polarization isolation at the repeater device. Non-EHF interfaces, for example Bluetooth, may be utilized to establish the control connections.

Figure 1:
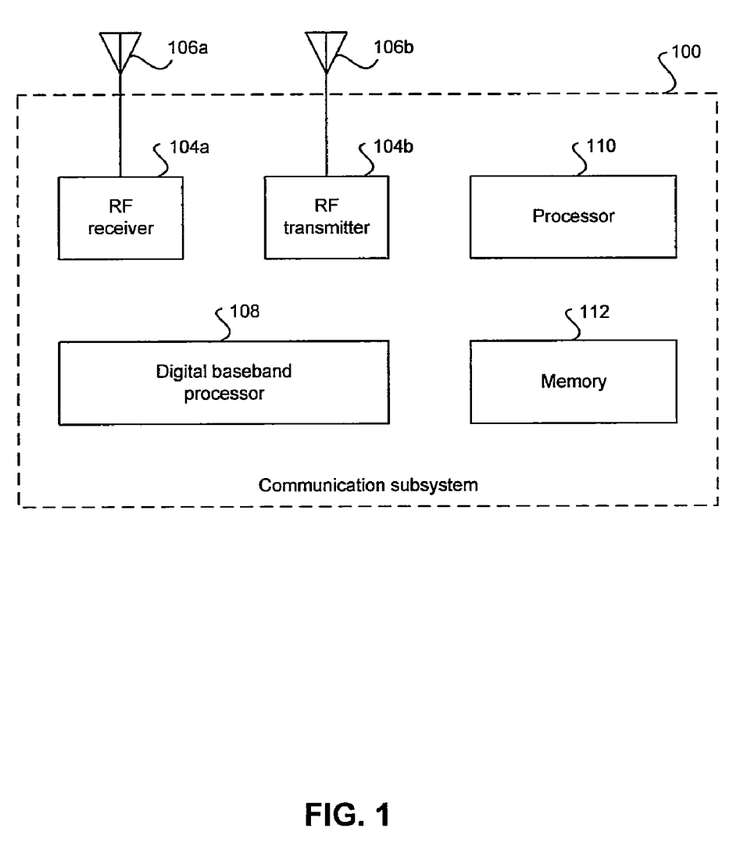
FIG. 1 is a block diagram illustrating an exemplary communication subsystem, which may be utilized in accordance with an embodiment of the invention.

FIG. 1 is a block diagram illustrating an exemplary communication subsystem, which may be utilized in accordance with an embodiment of the invention. Referring to FIG. 1, there is shown a communication subsystem 102, an RF receiver 104a, an RF transmitter 104b, a receive antenna 106a, a transmit antenna 106b, a digital baseband processor 108, a processor 110, and a memory 112.

The communication subsystem 102 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 102 may be integrated or located within a wireless device to enable operations in a wireless system, such as the cellular network and/or digital video broadcast network.

The receive antenna 106a may comprise suitable logic, circuitry, and/or code that may enable reception of RF signals; receive antenna 106a may be communicatively coupled to the RF receiver 104a. The RF receiver 104a may comprise suitable logic, circuitry, and/or code that may enable processing of received RF signals. The RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. The receive antenna 106a and the RF receiver 104a may also enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. The RF transmitter 104b may up-convert the baseband frequency signal to an RF signals. The RF transmitter 104b may perform direct up-conversion of the baseband frequency signal to a RF signals of approximately 60 GHz, for example. In some instances, the RF transmitter 104b may enable digital-to-analog conversion of the baseband signal components received from the digital baseband processor 108 before up conversion. In other instances, the RF transmitter 104b may receive baseband signal components in analog form. The transmit antenna 106b and the RF transmitter 104b may also enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 102. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 102. The processor 110 may also enable executing of applications that may be utilized by the communication subsystem 102. For example, the processor 110 may execute applications that may enable displaying and/or interacting with content received via RF signals in the communication subsystem 102.

The memory 112 may comprise suitable logic, circuitry, and/or code that may enable storage of data and/or other information utilized by the communication subsystem 102. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 102. For example, the memory 112 may comprise information necessary to configure the RF receiver 104a to enable receiving signals in the appropriate frequency band.

In operation, the communication subsystem 102 may enable communication via RF interfaces. For example, the communication subsystem 102 may receive RF signals operating in the 60 GHz band via the receive antenna 106a; wherein the RF receiver 104a may enable initial processing of the received signal. The communication subsystem 102 may transmit RF signals operating in the 60 GHz band via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via 60 GHz RF signals. The digital 108 may enable performing signal processing operation such as analog-to-digital conversion, encoding/decoding of received and/or transmitted data via the 60 GHz RF signals. The processor 110 may enable controlling of the operations of the communication subsystem 102. For example, the processor 110 may enable operating of the transmit and/or the receive antennas to enable aligning during 60 GHz RF communications.

In addition to EHF communications, which may have limited operational range compared with lower frequency RF interfaces, the communication subsystem 102 may be enabled to utilize other wireless interfaces and/or protocols. For example, the communication subsystem 102 may be enabled to utilize such wireless interfaces as Bluetooth to perform Bluetooth RF communications. Accordingly, the receive antenna 106a, the RF receiver 104a, and/or other components within the communication subsystem 102 may enable reception of non-EHF RF signals, for example, Bluetooth RF signals. Similarly, the transmit antenna 106b, the RF transmitter 104b, and/or other components within the communication subsystem 102 may enable transmission of non-EHF RF signals, for example, Bluetooth RF signals. The non-EHF interfaces that may be supported in the communication subsystem 102 may be utilized to send information regarding the communication subsystem 102. For example, a Bluetooth connection may be utilized to send information regarding the capability of the communication subsystem 102 and/or to receive messages containing information regarding preferred setting that may be utilized while performing EHF communication.

Figure 2:
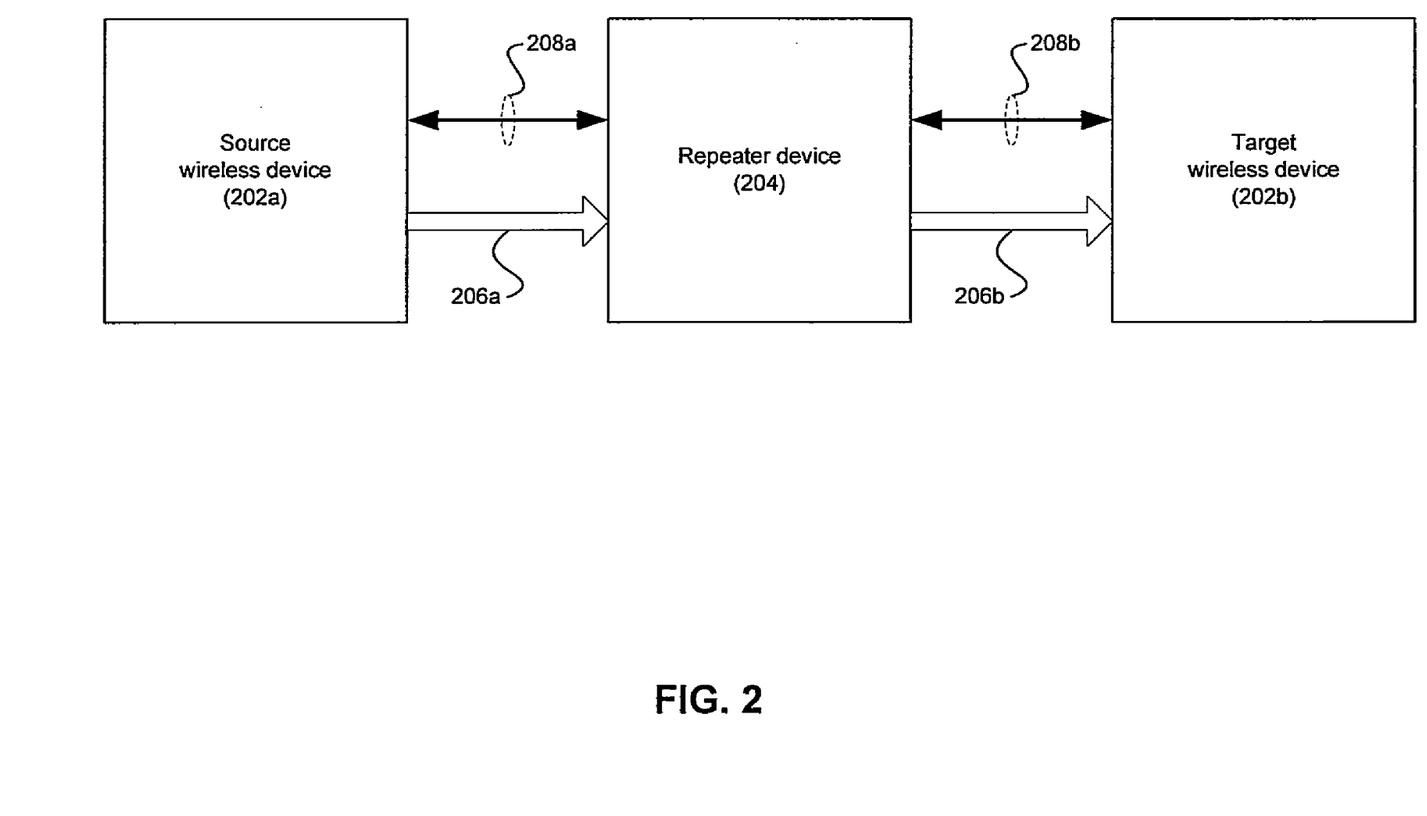
FIG. 2 is a block diagram illustrating a repeater device utilized to forward EHF communication between two wireless devices, which may be utilized in accordance with an embodiment of the invention.

FIG. 2 is a block diagram illustrating a repeater device utilized to forward EHF communication between two wireless devices, which may be utilized in accordance with an embodiment of the invention. Referring to FIG. 2, there is shown a source wireless device 202a, a target wireless device 202b, a repeater device 204, EHF connections 206a and 206b, and control connections 208a and 208b.

The source wireless device 202a and the target wireless device 202b may each comprise suitable logic, circuitry, and/or code that may enable receiving, transmitting, and processing of RF signals. For example, the source wireless device 202a and the target wireless device 202b may each comprise the communication subsystem 102, substantially as described in FIG. 1.

The repeater device 204 may comprise suitable logic, circuitry, and/or code that may enable reception and/or transmission of EHF signals to facilitate forwarding EHF signals from the source wireless device 202a to the target wireless device 202b. Additionally, the repeater device 204 may comprise suitable logic, circuitry, and/or code that may enable establishing and/or utilizing control connections 208a and 208b with the source wireless device 202a and/or target wireless device 202b, respectively.

The EHF connections 206a and 206b may each comprise a radio (RF) and/or wireless link that may be based on an EHF protocol that may comprise the 60 GHz interface. The control connections 208a and 208b may each comprise a radio (RF) and/or wireless link that may be based on a non-EHF protocol that may comprise Bluetooth, which may be utilized to communicate control messages between the source wireless device 202a and the repeater device 204, and between the repeater device 204 and the target device 202b, respectively.

In operation, the repeater device 204 may enable forwarding EHF RF signals transmitted from the source wireless device 202a via the EHF connection 206a, to the target wireless device 202b via the EHF connection 206b. The wireless device 202a may utilize the communication subsystem 102 to enable transmission of EHF RF signals via the EHF connection 206a. The wireless device 202b may utilize the communication subsystem 102 to enable reception of EHF RF signals via the EHF connection 206b. The repeater device 204 may be utilized because EHF RF signals may have limited operational range. The source wireless device 202a, the target wireless device 202b, and/or the repeater device 204 may utilize the control connections 208a and/or 208b during EHF communication between the three devices. The control connections 208a and/or 208b may enable exchanging control messages, data, and/or information that may enable facilitating EHF communication. For example, the control connection 208a and/or 208b may enable the repeater device 204 to receive and/or transmit control messages that may enable the source wireless device 202a to transmit EHF RF signals to the repeater device 204 via the EHF connection 206a, and/or may enable the target wireless device 202b to receive EHF RF signals from the repeater device 204 via the EHF connection 206b.

Figure 3A:
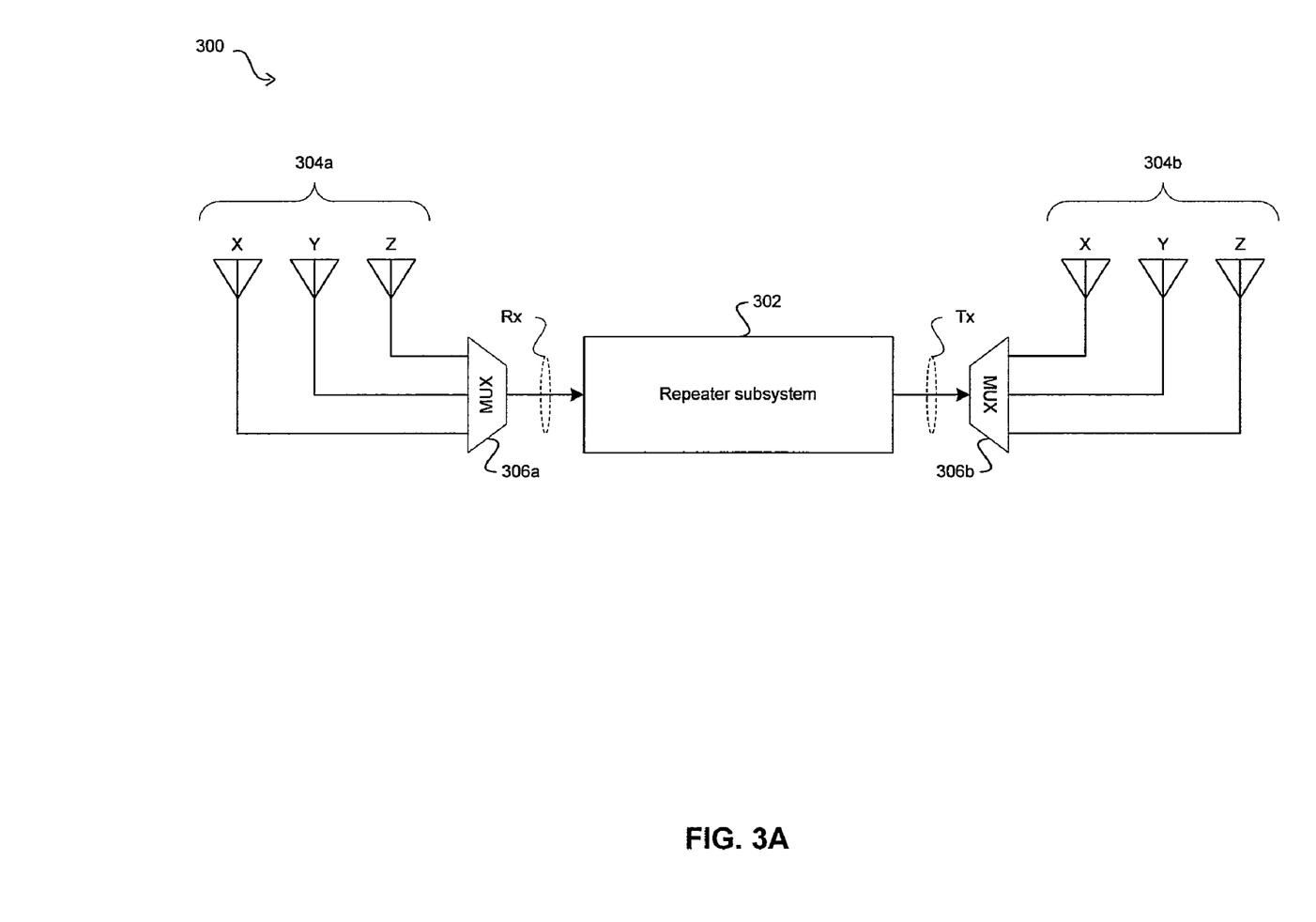
FIG. 3A is a block diagram illustrating a repeater system utilizing multiple polarization antenna arrays to forward EHF communication, in accordance with an embodiment of the invention.

FIG. 3A is a block diagram illustrating a repeater system utilizing multiple polarization antenna arrays to forward EHF communication, in accordance with an embodiment of the invention. Referring to FIG. 3A, there is shown a repeater system 300, a repeater subsystem 302, a receive (Rx) antenna array 304a, a receive multiplexer (MUX) 306a, a transmit (Tx) antenna array 304b, and a transmit multiplexer (MUX) 306b.

The repeater system 300 may comprise the repeater subsystem 302, the Rx antenna array 304a, the receive MUX 306a, the Tx antenna array 304b, the receive MUX 306b, and suitable logic, circuitry, and/or code that may enable reception and/or transmission of EHF signals to facilitate forwarding of EHF signals, wherein the repeater system 300 may be integrated within a repeater device substantially similar to the repeater device 204 as described in FIG. 2.

The repeater subsystem 302 may comprise suitable logic, circuitry, and/or code that may enable controlling and/or performing of signal processing that may be necessary to perform reception and/or transmission of EHF signals via the repeater system 300.

The receive multiplexer (MUX) 306a may comprise suitable logic, circuitry, and/or code that may enable selecting one or more of a plurality of available receive paths for receiving a signal. The transmit multiplexer (MUX) 306b may comprise suitable logic, circuitry, and/or code that may enable selecting one or more of a plurality of available transmit paths for transmitting a signal.

The receive (Rx) antenna array 304a may comprise antennas X, Y, and Z, and suitable logic, circuitry, and/or code that may enable reception of EHF RF signals. The antennas X, Y, and Z may enable reception of EHF RF signals that may have different polarizations, wherein each of antennas X, Y, and Z may enable minimal polarization mismatch between a received EHF RF signals and the respective antenna. For example, a received EHF RF signals may have a minimal polarization mismatch with antenna X, wherein antenna X may be an optimal antenna for reception of the EHF RF signals.

The transmit (Tx) antenna array 304b may comprise antennas X, Y, and Z, and suitable logic, circuitry, and/or code that may enable transmission of EHF RF signals. The antennas X, Y, and Z may enable transmission of EHF RF signals that may comprise different polarizations. In this regard, each of transmitted EHF RF signals by antennas X, Y, and Z may be optimal for reception by a wireless device depending on availability of proper polarization antenna in the receiving wireless device.

In operation, the repeater system 300 may utilize polarization isolation to prevent and/or reduce interference at the repeater system 300 between EHF RF signals received via EHF by the repeater system 300 and EHF RF signals transmitted from the repeater system 300 wherein the transmitted and the received EHF RF signals may optimally have 90° differential in polarization. For example, the repeater system 300 may determine, via the control connection 208a, that the source wireless device 202a may be transmitting EHF RF signals that are optimal for antenna X in the receive antenna array 304a. Accordingly, the repeater system 300 may set the receive MUX 306a, via the repeater subsystem 302, to select the antenna X in the receive antenna array 304a while receiving EHF RF signals from the source wireless device 202a. Furthermore, the repeater system 300 may determine, via the repeater subsystem 302 and/or control connection 208b, that transmitting EHF RF signals via the Y antenna in the transmit antenna array 304b may enable polarization isolation between the received and transmitted EHF RF signals, and that the target wireless device 202b may be enable able receive EHF RF signals transmitted via the antenna Y in the transmit antenna array 304b. Accordingly, the repeater system 300 may set the transmit MUX 306b, via the repeater subsystem 302, to select the antenna Y in the transmit antenna array 304b while transmitting EHF RF signals to the target wireless device 202b.

Figure 3B:
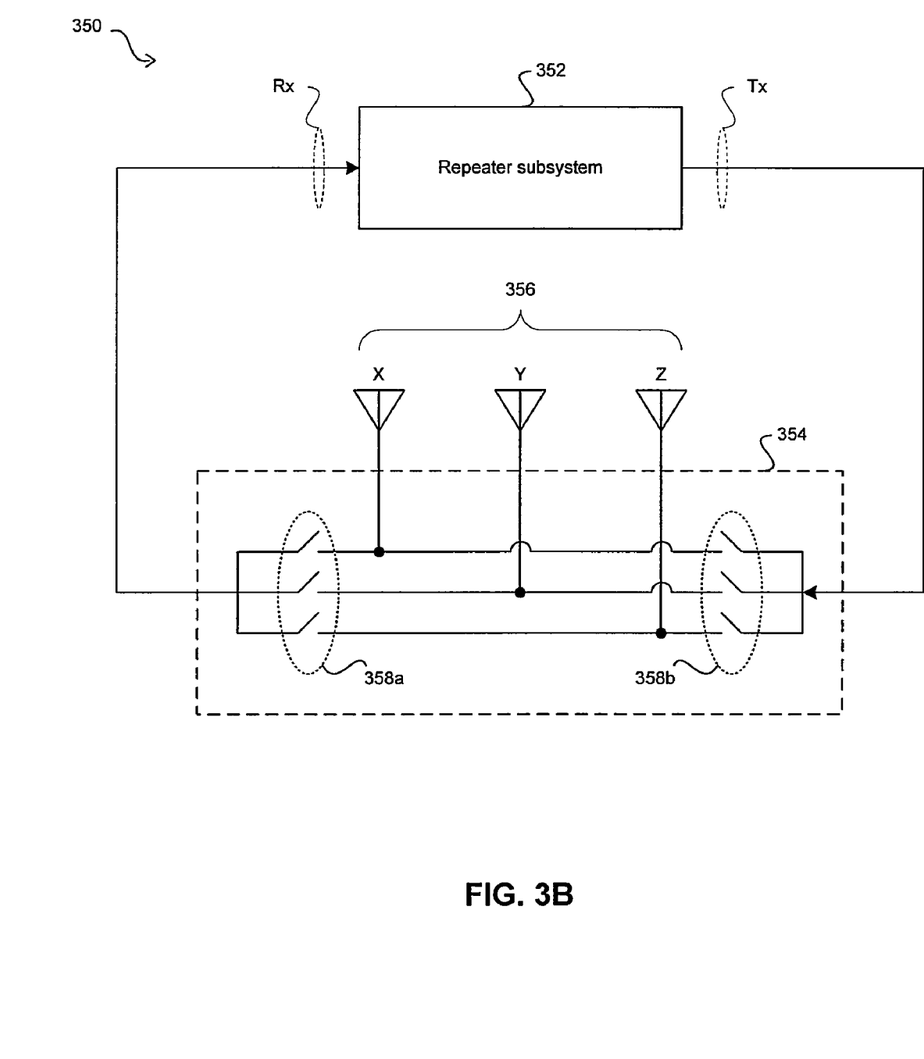
FIG. 3B is a block diagram illustrating a repeater system utilizing a single polarization antenna array, with switching mechanism, to forward EHF communication, in accordance with an embodiment of the invention

FIG. 3B is a block diagram illustrating a repeater system utilizing a single polarization antenna array, with switching mechanism, to forward EHF communication, in accordance with an embodiment of the invention. Referring to FIG. 3B, there is shown a repeater system 350, a repeater subsystem 352, an antenna subsystem 354, an antenna array 356, and switching elements 358a and 358b.

The repeater system 350 may comprise the repeater subsystem 352, the antenna subsystem 354, the antenna array 356, the signal switching elements 358a and 358b, and suitable logic, circuitry, and/or code that may enable reception and/or transmission of EHF signals to facilitate forwarding EHF signals. The repeater system 350 may be integrated within a repeater device substantially similar to the repeater device 204 as described in FIG. 2.

The repeater subsystem 352 may be substantially similar to the repeater subsystem 302 as described in FIG. 3A.

The antenna subsystem 354 may comprise an antenna array 356, switching elements 358a and 358b, and suitable logic, circuitry, and/or code that may enable utilizing antenna array 356 for transmission and/or reception of EHF RF signals.

The switching elements 358a and 358b may each comprise suitable logic, circuitry, and/or code that may enable switching on and off one or more of available paths within said switching elements 358a and 358b.

The antenna array 356 may comprise antennas X, Y, and Z, and suitable logic, circuitry, and/or code that may enable reception and transmission of EHF RF signals. The antennas X, Y, and Z may be comprised to enable reception and/or reception of EHF RF signals that may comprise different polarizations, wherein each of antennas X, Y, and Z may enable minimal polarization mismatch between a received EHF RF signals and the respective antenna during reception of EHF RF signals. Additionally, each of transmitted EHF RF signals by antennas X, Y, and Z may be optimal for reception by a wireless device depending on availability of proper polarization antenna in the receiving wireless device.

In operation, the repeater system 350 may utilize polarization isolation to prevent and/or reduce interference at the repeater system 350 between EHF RF signals received via EHF by the repeater system 350 and EHF RF signals transmitted from the repeater system 350 wherein the transmitted and the received EHF RF signals may optimally have 90° differential in polarization. For example, the repeater system 350 may determine, via the control connection 208a, that the source wireless device 202a may be transmitting EHF RF signals that are optimal for antenna X in the antenna array 356. Accordingly, the repeater system 350 may set the switching element 358a, via the repeater subsystem 352, to enable utilizing the antenna X in the antenna array 356, and deselecting antennas Y and Z in the antenna array 356 while receiving EHF RF signals from the source wireless device 202a. Furthermore, the repeater system 350 may determine, via the repeater subsystem 352 and/or control connection 208b, that transmitting EHF RF signals via the Y antenna in the antenna array 356 may enable polarization isolation between the received and transmitted EHF RF signals. The repeater system 350 may also determine that the target wireless device 202b may enable receiving of EHF RF signals transmitted via the antenna Y in the antenna array 356. Accordingly, the repeater system 350 may set or configure the switching element 358b, via the repeater subsystem 352, to enable utilizing the antenna Y in the antenna array 356 while transmitting EHF RF signals to the target wireless device 202b.

Figure 4:
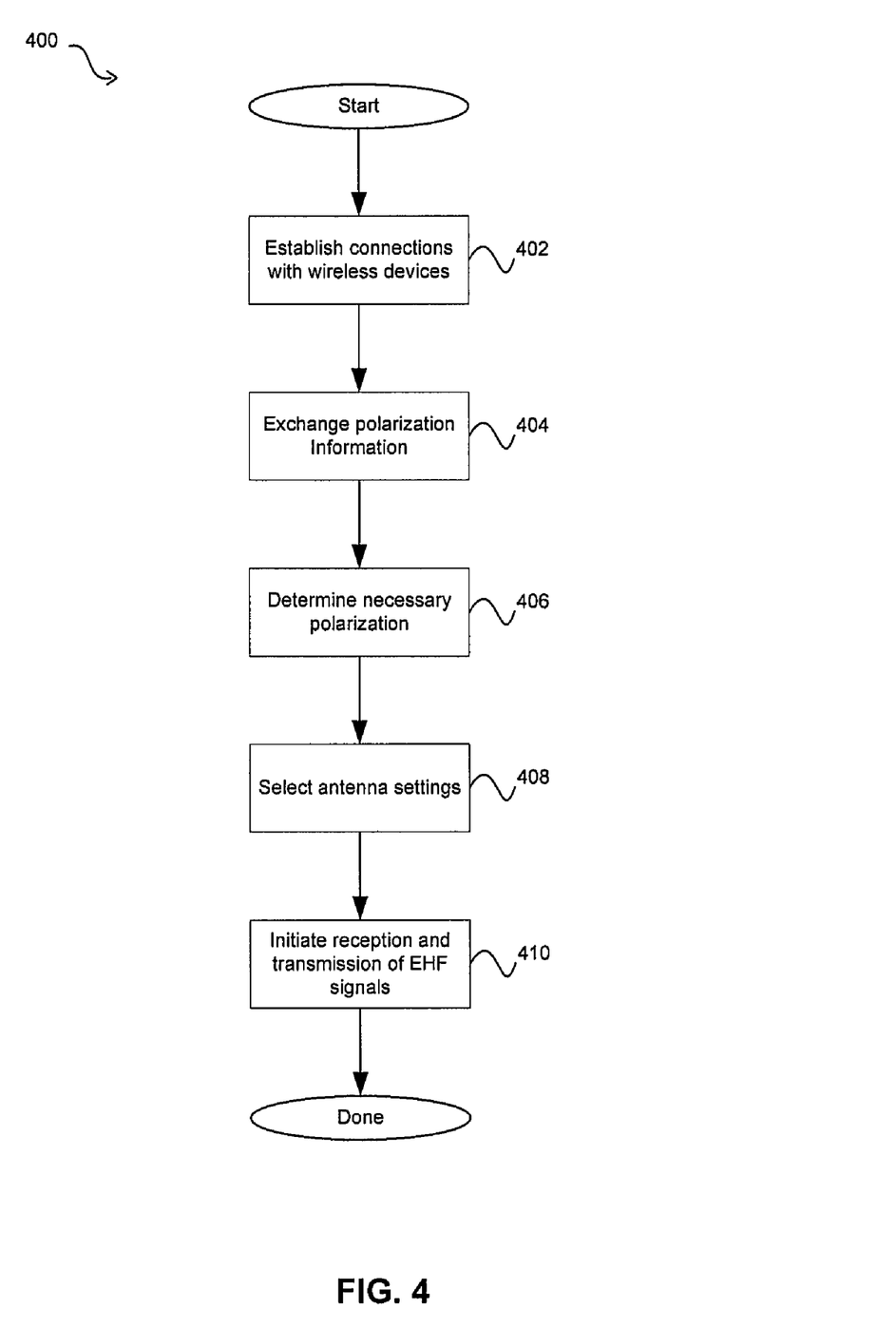
FIG. 4 is an exemplary flow diagram illustrating use of polarization isolation in a repeater device, in accordance with an embodiment of the invention.

FIG. 4 is an exemplary flow diagram illustrating use of polarization isolation in a repeater device, in accordance with an embodiment of the invention. Referring to FIG. 4, there is shown a flow chart 400 comprising a plurality of exemplary steps. In step 402, the repeater device 204 may establish control connections 208a and 208b with the source wireless device 202a and the target wireless device 202b, respectively, to enable interactions among the devices during EHF RF communication. In step 404, the repeater 204, and/or wireless devices 202a and/or 202b may each request, transmit, and/or receive polarization information via the control connections 208a and/or 208b. The polarization information may comprise information regarding availability of polarization antenna in one or more of the repeater 204, and/or wireless devices 202a and/or 202b. Additionally, the polarization information may also comprise intended, desired, and/or available polarization that may be utilized in transmitted and/or received EHF RF signals in the repeater 204, and/or wireless devices 202a and/or 202b.

In step 406, necessary and/or optimal polarization may be determined among the repeater 204, and/or wireless devices 202a and/or 202b, wherein a preferred polarization for EHF RF signals received at, and transmit from the repeater device 204 may be determined. For example, the repeater device 204 and/or source wireless device 202a may determine, via control connection 208a, that source wireless device 202a may transmit EHF RF signals wherein antenna X in receive antenna array 304a may enable minimal polarization mismatch. Similarly, the repeater device 204 and/or target wireless device 202b may determine, via control connection 208b, that repeater device 204 may transmit EHF RF signals via antenna Y in the transmit antenna array 304b.

In step 408, antenna settings consistent with polarization determination performed in step 406 may be applied. For example, where the repeater device 204 may comprise the repeater system 300, the antenna X may be specified in the receive antenna array 304a for reception of EHF RF signals transmitted by the source wireless device 202a, while the antenna Y may be specified in the transmit antenna array 304b for transmission of EHF RF signals to the target wireless device 202b. In step 410, EHF RF communication may be initiated among the repeater 204, and/or wireless devices 202a and/or 202b. For example, once the repeater device 204 may complete antenna setting as performed in step 408, the repeater device 204 may communicate to the wireless devices 202a and/or 202b, via control connections 208a and/or 208b, respectively, that the repeater device 204 may be ready for EHF forwarding operation. Accordingly, the source wireless device 202a may commence transmitting EHF RF signals to the repeater device 204, and/or the target wireless device 202b may initiate EHF RF signals reception operations.

Various embodiments of the invention may comprise a method and system for sharing multiple antennas between Tx and Rx in a repeat field of polarization isolation. The repeater device 204 may enable forwarding extreme high frequency (EHF) communication between the source wireless device 202a and the target wireless device 202b. The repeater device 204 may utilize polarization isolation to prevent and/or reduce interference between received and transmitted EHF RF signals in the repeater device 204. The repeater device 204 may utilize repeater system 300 with different polarization antenna arrays, 304a and 304b, for reception and/or transmission of EHF RF signals to facilitate polarization isolation between received and transmitted EHF RF signals. Alternatively, the repeater device 204 may comprise repeater system 350 to enable utilizing a single polarization antenna array 356, with switching elements 356a and 356b, to facilitate polarization isolation between received and transmitted EHF RF signals. The repeater device 204 may utilize control connections 208a and/or 208b to enable communicating with source wireless device 202a and/or target wireless device 202b to facilitate performing polarization isolation at the repeater device 204. Non-EHF interfaces, for example Bluetooth, may be utilized to establish the control connections 208a and/or 208b.

Another embodiment of the invention may provide a machine-readable storage, having stored thereon, a computer program having at least one code section executable by a machine, thereby causing the machine to perform the steps as described herein for sharing multiple antennas between Tx and Rx in a repeat field of polarization isolation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
    mitigating via polarization isolation, signal interference between receive (Rx) and transmit (Tx) signals in a repeater device that extends a range of extremely high frequency (EHF) signals communicated between a plurality of wireless devices; and
    selecting, based on said mitigation, from a plurality of available antennas in said repeater device at least one antenna for use for EHF signal reception and at least one different antenna for use for EHF signals transmission.

2. The method according to claim 1, wherein said extremely high frequency (EHF) signals comprise 60 GHz signals.

3. The method according to claim 1, comprising configuring one or more receive (Rx) polarization antenna arrays and one or more transmit (Tx) polarization antenna arrays to perform said polarization isolation in said repeater device.

4. The method according to claim 1, comprising utilizing a single polarization antenna array to perform said polarization isolation in said repeater device.

5. The method according to claim 4, comprising selecting via one or more switching elements, different antennas, for transmission and reception of said extremely high frequency (EHF) signals, within said single polarization antenna array to enable said polarization isolation in said repeater device.

6. The method according to claim 1, comprising coordinating said polarization isolation in said repeater device utilizing one or more control connections between said repeater device, and a source wireless device and/or target wireless device to enable polarization isolation in said repeater device.

7. The method according to claim 6, wherein said one or more control connections comprise non-extremely high frequency (non-EHF) connections.

8. The method according to claim 7, wherein said non-EHF connections comprise Bluetooth (BT) connections and/or ultra-wideband (UWB) connections.

9. The method according to claim 6, wherein said coordinating comprises enabling said repeater device to negotiate, via said one or more control connections, with said source wireless device and/or said target wireless device to set a polarization of said receive (Rx) and/or transmit (Tx) signals to enable said polarization isolation in said repeater device.

10. A machine-readable storage having stored thereon, a computer program having at least one code section for wireless communication, the at least one code section being executable by a machine for causing the machine to perform steps comprising:
    mitigating via polarization isolation, signal interference between receive (Rx) and transmit (Tx) signals in a repeater device that extends a range of extremely high frequency (EHF) signals communicated between a plurality of wireless devices; and
    selecting, based on said mitigation, from a plurality of available antennas in said repeater device at least one antenna for use for EHF signal reception and at least one different antenna for use for EHF signals transmission.

11. The machine-readable storage according to claim 10, wherein said extremely high frequency (EHF) signals comprise 60 GHz signals.

12. The machine-readable storage according to claim 10, wherein said at least one code section comprises code for configuring one or more receive (Rx) polarization antenna arrays and one or more transmit (Tx) polarization antenna arrays to perform said polarization isolation in said repeater device.

13. The machine-readable storage according to claim 10, wherein said at least one code section comprises code for utilizing a single polarization antenna array to perform said polarization isolation in said repeater device.

14. The machine-readable storage according to claim 13, wherein said at least one code section comprises code for selecting via one or more switching elements, different antennas, for transmission and reception of said extremely high frequency (EHF) signals, within said single polarization antenna array to enable said polarization isolation in said repeater device.

15. The machine-readable storage according to claim 10, wherein said at least one code section comprises code for coordinating said polarization isolation in said repeater device utilizing one or more control connections between said repeater device, and a source wireless device and/or target wireless device to enable said polarization isolation in said repeater device.

16. The machine-readable storage according to claim 15, wherein said coordinating comprises enabling said repeater device to negotiate, via said one or more control connections, with said source wireless device and/or said target wireless device to set a polarization of said receive (Rx) and/or transmit (Tx) signals to enable said polarization isolation in said repeater device.

17. A system for wireless communication, the system comprising:
one or more processors that enable mitigation, via polarization isolation, of signal interference between receive (Rx) and transmit (Tx) signals in a repeater device that extends a range of extremely high frequency (EHF) signals communicated between a plurality of wireless devices; and
said one or more processors are operable to select, based on said mitigation, from a plurality of available antennas in said repeater device at least one antenna for use for EHF signal reception and at least one different antenna for use for EHF signals transmission.

18. The system according to claim 17, wherein said extremely high frequency signals comprises 60 GHz signals.

19. The system according to claim 17, wherein said one or more processors enable configuration of one or more receive (Rx) polarization antenna arrays and one or more transmit (Tx) polarization antenna arrays to perform said polarization isolation in said repeater device.

20. The system according to claim 17, wherein said one or more processors enable utilization of a single polarization antenna array to perform said polarization isolation in said repeater device.

21. The system according to claim 20, wherein said one or more processors enable selection, via one or more switching elements, of different antennas, for transmission and reception of said extremely high frequency (EHF) signals, within said single polarization antenna array to enable said polarization isolation in said repeater device.

22. The system according to claim 17, wherein said one or more processors enable coordination of said polarization isolation in said repeater device utilizing one or more control connections between said repeater device, and a source wireless device and/or target wireless device to enable said polarization isolation in said repeater device.

23. The system according to claim 22, wherein said one or more control connections comprise non-extremely high frequency (non-EHF) connections.

24. The system according to claim 23, wherein said non-EHF connections comprise Bluetooth (BT) connections and/or ultra-wideband (UWB) connections.

25. The system according to claim 22, wherein said coordination comprises enabling said repeater device to negotiate, via said one or more control connections, with said source wireless device and/or said target wireless device to set a polarization of said receive (Rx) and/or transmit (Tx) signals to enable said polarization isolation in said repeater device.

* * * * *